Sept. 26, 1939.    N. SCHWARTZ    2,174,370
RESPIRATOR
Filed Dec. 24, 1936
Fig. 1.
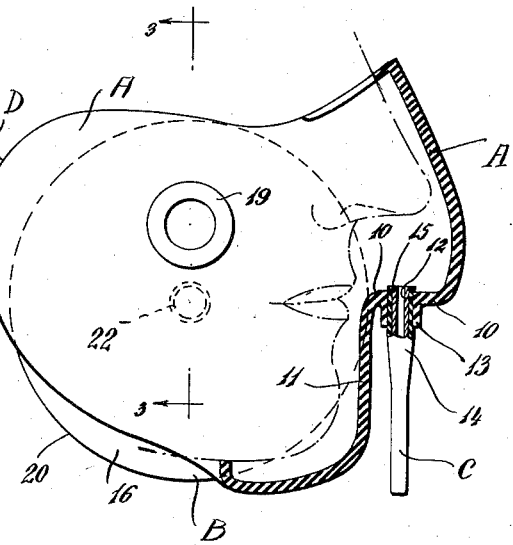
Fig. 2.
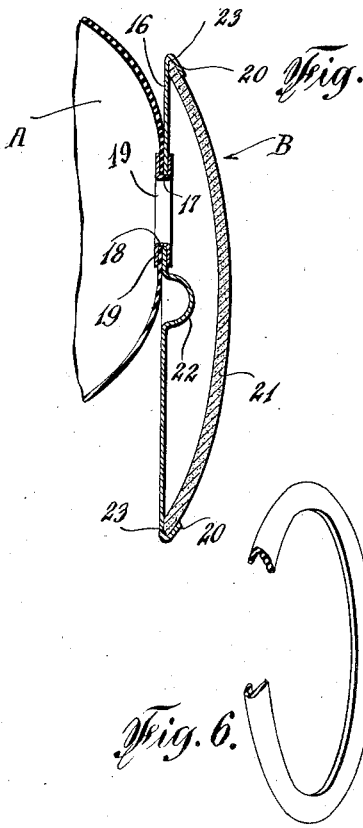
Fig. 3.
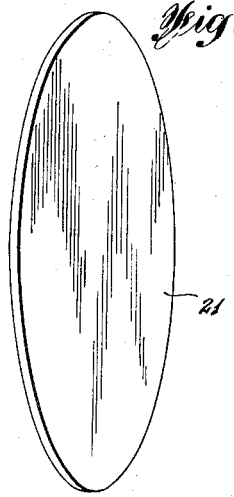
Fig. 4.
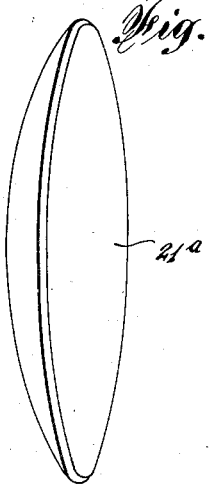
Fig. 5.
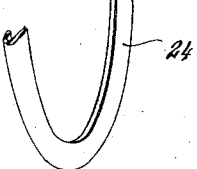
Fig. 6.
Fig. 7.
INVENTOR
Nathan Schwartz Patented Sept. 26, 1939

2,174,370

UNITED STATES PATENT OFFICE 2,174,370

RESPIRATOR

Nathan Schwartz, New York, N. Y.

Application December 24, 1936, Serial No. 117,479

4 Claims. (Cl. 128—146)

This invention relates to filter type respirators adapted to cover the nose and mouth of the wearer for the purpose of protection against dust fumes and injurious gases and is a modification of my copending application for Letters Patent filed December 18, 1936, Serial No. 116,456, and my copending application Serial No. 110,557, dated November 13, 1936.

The invention broadly aims to provide a filter type respirator of minimum size and weight while affording a maximum area of filtration and also to facilitate the replacement of filter material and also to provide an air proof engagement of the filter material at its marginal section and also to provide suitable filter material as to texture, shape, form and size, and also to conveniently locate the exhalation valve.

More particularly the invention resides in the provision of an inturned marginal flange which forms with its base an acute angle whereby the filter material which is inserted between the said flange and its base is secured thereat by being wedged therein, thereby providing an air proof marginal attachment of the said filter material.

Another feature is to provide an efficient filter material which is blocked to form a substantially bowl shaped element.

Another feature is to provide a stiffened felt filter material which is efficient for filtering purposes and the size thereof is a degree larger than its receptive element and therefore at insertion of the said material into its receptive element a substantial outward bulge is obtained and the said outward bulge aids in the provision of a proper spacing between the filter material and its supporting part.

Another feature is to provide a V shaped molded elastic marginally encircling rim collar which is a degree smaller than its receptive element and therefore when emplaced its contractile tendency aids in the sealing of the filter material and flange juncture.

Another feature is to provide a set back below the nose line to conveniently locate the exhalation valve.

With the above recited and other objects in view reference is had to the following description and accompanying drawing in which there is exhibited one example or embodiment of the invention while the claims define the actual scope of the same.

In the drawing:

Figure 1 is a perspective view of the improved respirator in applied position.

Figure 2 is a section on line 2—2 of Figure 1.

Figure 3 is a section on line 3—3 of Figure 2.

Figure 4 is a perspective of the felt filter material which is used in the filter unit.

Figure 5 is a perspective of a blocked substantially bowl shaped filter material which is used in the filter unit, as a modified form.

Figure 6 shows a modification of the filter unit margin and includes a molded elastic rubber marginal encircling rim, partly in section.

Figure 7 shows the molded elastic marginal encircling rubber in applied position.

Referring to the drawing by character reference, A designates the face piece of the respirator, B the filter unit, C the exhalation valve and D the head band.

The face piece A of the respirator is preferably constructed of molded elastic rubber or its equivalent and is adapted to engage the face of the wearer in covering relation to the nose and mouth and is secured to the face by means of the head bands D, which are fastened behind the head or neck. Below the nose line there is provided a set back portion, which set back portion has a horizontal wall 10 and a vertical wall 11. In the set back portion is located the exhalation valve C, and the said valve is suspended from the horizontal wall 10. There is a hole 12 in the said horizontal wall 10 and a depending boss 13 surrounds the said hole. The valve C has inserted at its outlet end 14, an aluminum metal tube 15 and the valve is a regulation army gas mask type exhalation valve. The outlet section of the valve is inserted into the tubular depending boss 13 and is adhesively attached thereto.

The filter unit B has a wall 16 which wall has a hole 17, which hole registers with a similar hole 18 in the face piece of the respirator and by means of an eyelet 19 are joined together. The said wall 16 has an inturned marginal flange 20, which flange is disposed at an acute angle with relation to its base, which base is the wall 16. A filter material 21 is inserted between the wall and the flange and due to the acute angle formation at their juncture a wedging therein of the filter material 21 is obtained. The said wedging is enhanced when the size of the filter material is larger than the size of the receptive part. Also an additional usefulness is obtained by making the size of the filter material larger than that of the receptive part, namely the said filter material is caused thereby to bulge outwardly from the wall of the said juncture and thus provide a needed space between the said wall and the said filter material in order that the entire filter area remain free and unobstructed and thus to maintain a large filter area, which is needed for making inspirational breathing easy. The exhaust valve is provided to make exhalation easy.

The best filter material with which to obtain this formation is an efficient felt filter material and it must have a substantial stiffness. If the filter material is soft a spacing means at the wall must be provided which spacing means may be indents 22. One such indent 22 is shown at the center of the wall 16, but if required additional indents like the one shown may be added. When desired instead of the indents 22, other equivalent elevations may be supplied at the inner side of the filter unit wall 16, for the purpose of maintaining a spaced relation for the filter material 21.

In a modified form of this invention the filter material 21a is blocked and is thus inserted in the angular juncture or groove 23. That is the filter material 21a is formed and shaped to maintain a substantially bowl shaped element. Certain felt filter material are especially adaptable for this shaping and forming treatment and thereby are in proper form for maintaining a spaced relation with the supporting wall. Also in this form the said filter material is preferably a slight degree larger than its receptive part and thereby the fit into the receptive part is snug and secured and also its shape is thus properly retained.

In a modified form of this invention as illustrated in Figures 6 and 7 a molded elastic rubber marginal encircling rim 24 is provided and the encircling part 24 is substantially V shaped and one arm of the V is longer than other. The short arm clamps the margin at the rear side and the long arm grips the flange 20 and the filter material 21 at its marginal end which is immediately adjacent to the flange 20, and thereby an additional securing support is provided and maintained, and also additional sealing at the intake juncture is perfected. In practise the said encircling rim is in a slight degree smaller than its receptive part and thereby a resilient contraction and pressure is produced at the juncture of the filter material and the flange, thus providing and securing a tightly sealed detachable juncture. That is the filter materal is thus removably secured. Also the molded rubber rim 24 is removable. The soft texture felt requires the additional grip that is provided by the said rubber rim.

It is to be understood that high standards for filter type respirators have been set. That is a high percentage of filtration is required and also a low resistance to breathing is required and also selective separating qualities are required. That is neutralizing poisonous fumes and acids must be accomplished. For this objective the filter material is in the main a felt type material or a treated porous paper filter materal backed up by a screening felt material. The said filter materials are variously treated to obtain a high standard for the particular selective filtration, such as dust, lead fumes, or other poisonous fumes. In the treatments of the filter material for special purposes, the said filter material may become soft, stiff, or medium. The provisions outlined in this invention anticipate and recognize the said textures and makes the filter unit herein disclosed practical for any texture filter material, of the porous felt, cotton, paper or textile type.

It is to be noticed that the exhalation valve is located at a convenient place, in a set back portion of the face piece of the respirator. The said set back portion is below the nose line approximating substantially the mouth line, therefore there are two advantages by the location of the said valve, namely immediate dissipation and escape of the exhaled air, near the point of exhalation thereby enhancing escape of the exhaled air easily and more effectively than if the valve is located distantly from the point of exhalation. Also the said location is convenient because it diminishes or eliminates any discomfiture from the said valve.

Having thus described my invention I claim as new and desire to secure by Letters Patent as follows:

1. In a respirator, a face piece connected with an exhaust valve by means of a duct at a set back portion below the nose line, and having an intake port, a filter unit having a wall with an outlet port and a substantially stiffened and bowl shaped filter material and means provided at the margin of said wall to removably secure the said filter material at the edges thereof and the said filter material confronts the said wall and is in spaced relation therewith and the said intake port connects with the said outlet port and thereby establishing a communication between the said face piece and the said filter unit.

2. In a respirator, a face piece with an inlet port, a filter unit having a frame wall with an aperture, and a marginal inwardly opening bevelled groove, the outer wall of said groove being formed by an inturned flange, a substantially stiffened and bowl shaped filter pad, the edges of the said pad being displaceably secured within the said groove by having the same tucked therein in a manner whereby the said flange embraces thereon to form a leak proof joint thereat, and the said port and aperture register with one another with the said unit being located adjacent the said face piece.

3. In a respirator, a face piece with an inlet port, a filter unit having a frame wall with an aperture and a marginal inwardly opening groove, the outer wall of the said groove being formed by an inturned flange, a substantially stiffened and bowl shaped filter pad, the said pad being located in confronting and spaced relation to the said wall and aperture and the edges thereof displaceably secured within the said groove by the said flange embracing the same and annular supporting means which embraces the flange and the edges to provide reinforcement thereat for maintaining a leak proof and firm structure at the said joint formation, and the said aperture and port register one with the other, and the unit is located adjacent the face piece.

4. In a respirator, a face piece with an inlet port, a filter unit having a frame wall with an aperture, a central extrusion, and a peripheral inwardly opening groove, a substantially stiffened and bowl shaped filter pad, the edges of the said pad being displaceably secured in the said groove, and the said pad confronts the said wall and aperture and is spaced therefrom by the said extrusion and a free flow of air is thereby provided behind the said pad, and the said port registers with the said aperture.

NATHAN SCHWARTZ.